United States Patent
Keller et al.

(10) Patent No.: US 9,804,060 B2
(45) Date of Patent: Oct. 31, 2017

(54) CRASH BARRIER

(71) Applicant: Dr. Ing. h.c. F. Porsche Aktiengesellschaft, Stuttgart (DE)

(72) Inventors: Ralf Keller, Niefern-Oeschelbronn (DE); Eduard Ewert, Karlsruhe (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 408 days.

(21) Appl. No.: 14/571,370

(22) Filed: Dec. 16, 2014

(65) Prior Publication Data

US 2015/0168266 A1    Jun. 18, 2015

(30) Foreign Application Priority Data

Dec. 18, 2013 (DE) .................. 10 2013 114 323

(51) Int. Cl.
*G01M 17/007* (2006.01)

(52) U.S. Cl.
CPC .................. *G01M 17/0078* (2013.01)

(58) Field of Classification Search
None
See application file for complete search history.

(56) References Cited

U.S. PATENT DOCUMENTS

| 5,620,666 | A | * | 4/1997 | Usui | B01D 53/9454 29/890.08 |
| 2011/0226037 | A1 | * | 9/2011 | Rajasingham | G01M 17/0078 73/12.01 |
| 2012/0103056 | A1 | * | 5/2012 | Kuriyama | G01M 17/0078 73/12.01 |
| 2013/0018526 | A1 | * | 1/2013 | Kelly | G01M 17/0078 701/2 |

FOREIGN PATENT DOCUMENTS

| DE | 202 18 961 | | 2/2004 |
| DE | 10231823 | * | 2/2004 |
| DE | 10 2006 010 468 | | 9/2007 |
| JP | 10-123009 | | 5/1998 |
| JP | 2007-24084 | | 2/2007 |

OTHER PUBLICATIONS

German Search Report of Sep. 2, 2014.

* cited by examiner

*Primary Examiner* — Robert R Raevis
(74) *Attorney, Agent, or Firm* — Gerald E. Hespos; Michael J. Porco; Matthew T. Hespos

(57) ABSTRACT

A crash barrier for implementing a collision with a vehicle has a front to be moved toward the vehicle when the collision is implemented. The front side has a predetermined width and a predetermined height. The front side further has a selected surface region that takes up at most a 50% part of a width of the front side. A volume region of the crash barrier behind the surface region has a greater level of rigidity than a surrounding region of the crash barrier. Therefore, in the event of an impact against the vehicle, a greater level of rigidity acts in the selected surface region than in a surrounding region.

14 Claims, 3 Drawing Sheets

CRASH BARRIER

CROSS REFERENCE TO RELATED APPLICATION

This application claims priority under 35 USC 119 to German Patent Appl. No. 10 2013 114 323.7 filed on Dec. 18, 2013, the entire disclosure of which is incorporated herein by reference.

BACKGROUND

1. Field of the Invention

The invention relates to a crash barrier.

2. Description of the Related Art

The prior art discloses crash barriers with which a collision with a vehicle can be demonstrated. The crash barrier is moved toward the vehicle at a predetermined speed when the collision is implemented. The crash barrier here can be connected to a trolley that has a defined mass. Collision situations are implemented, for example, for colliding with a rear of a vehicle, with a front end of a vehicle or into a side of the vehicle. With said collision situations, the intention is to investigate what damage to the vehicle and which risks for the occupants of a vehicle may occur in the event of a collision.

It is an object of the invention to provide an improved crash barrier that can provide a more realistic simulation of a collision situation.

SUMMARY OF THE INVENTION

The invention relates to a crash barrier that can demonstrate a more realistic depiction of forces and pulses of a crash with another vehicle despite having a closed front side on the crash barrier. This is achieved in that a volume region of the crash barrier has a greater level of rigidity. As a result, the pulse in a longitudinal member of a vehicle can be demonstrated. Tests have shown that modern vehicle bodies have two longitudinal members with an increased level of rigidity. In the event of a collision between two vehicles, an increased pulse is transmitted to the other vehicle by a limited surface area of the longitudinal members. The previous crash barrier shape has taken too little account of this situation.

The increased rigidity within a predetermined volume region of the crash barrier to simulate the pulse behavior of a longitudinal member of a vehicle provides a simple and reliable demonstration of an impact performance of a vehicle with a longitudinal member. Increased rigidity can be implemented in a simple manner and does not require any substantial changes to a design of the crash barrier and to the connection of the crash barrier to a trolley. In addition, a closed front side of the crash barrier can be maintained. Furthermore, legal regulations regarding the shape of the crash barrier can be observed.

The volume region with the increased level of rigidity may be arranged at a predetermined distance from a front side of the crash barrier. This makes it possible to take account of a situation in which the longitudinal member of a vehicle body also does not project directly as far as the front side of the body, but rather ends at a defined distance from the front side of the body. Thus, a highly realistic depiction of the mechanical properties of a vehicle is taken into account.

The volume region with the increased rigidity may be brought as far as the front side. This embodiment depicts a vehicle body in which the rigidity of the body in front of the longitudinal member has hardly any effect, or no effect in the event of an impact. Depending on the embodiment selected, use can also be made of further arrangements for the locally stiffened volume region to provide a realistic depiction of a vehicle body. The crash barrier may have only one locally stiffened volume region. Although only one longitudinal member is provided, a relatively large amount of damage is caused, for example, in the event of a collision, with a lateral offset, against a rear or against a front of a vehicle. It is precisely this situation can be examined realistically examined using a crash barrier with only one stiffened volume region.

The damage in a vehicle between the longitudinal members of the body can be examined using the crash barrier. For example, a vehicle battery may be arranged between the longitudinal members, and therefore an impact of a further vehicle against the longitudinal member in the region of the battery constitutes a serious accident situation. This behavior can be examined realistically with the above described crash barrier.

The crash barrier and the volume region may be made from the same material. The selected volume region with the increased rigidity may be achieved by a structure that is changed in relation to the surrounding material of the crash barrier. For example, the material of the crash barrier can be a honeycomb structure, and the selected volume region may have a smaller honeycomb size than the surrounding region. The overall effect achieved by the smaller honeycomb size is an increased rigidity of the selected volume region. The increased rigidity for simulating a longitudinal member of a vehicle body therefore can be provided simply by using the same material, but with a changed structure. The use of the same material affords the advantage that mechanical and physical properties of the crash barrier are known throughout the volume and no mechanical, chemical or physical interfering effects can occur in the transition region between the selected volume region and the surrounding region of the crash barrier.

The crash barrier may have a different material in the selected volume region than in the surrounding volume region. Thus, the crash barrier can be produced more cost-effectively and in a simpler manner with the desired rigidity in the selected volume region.

Tests have shown that, to depict the mechanical and physical properties of a longitudinal member of a vehicle body within the scope of the crash barrier, it is of advantage to provide the selected volume region with a rigidity that is at least double, and preferably at least triple the rigidity of the surrounding material of the crash barrier. For example, the rigidity of the selected volume region can also have values that are greater than the rigidity of the surrounding material of the crash barrier by six times or more. With the aid of these large differences in the rigidity, the crash behavior of a vehicle body with a longitudinal member can be depicted in a manner resembling reality in a confined space. This relationship is necessary since the length of a vehicle body is not available for a crash barrier, but rather the crash barrier can have only a limited thickness to depict the pulse ratios and mass ratios of a vehicle.

The volume region can have a surface parallel to the front side of the crash barrier, and this surface may have a width of 10 cm to 30 cm and a height of 10 cm to 30 cm. A longitudinal member of a conventional vehicle body of a passenger vehicle can be depicted within the scope of this order of magnitude for the surface of the volume region.

Depending on the selected embodiment, the volume region can also have other, in particular larger, surfaces parallel to the front side.

The crash barrier may be produced from aluminum. Aluminum is readily suitable for depicting the rigidity and pulse ratios of a vehicle.

Depending on the selected embodiment, the crash barrier can have an impact layer on the front side. The impact layer may be provided for depicting the mechanical function of a bumper.

DETAILED DESCRIPTION OF THE PREFERRED EMBODIMENTS

Figure 1:
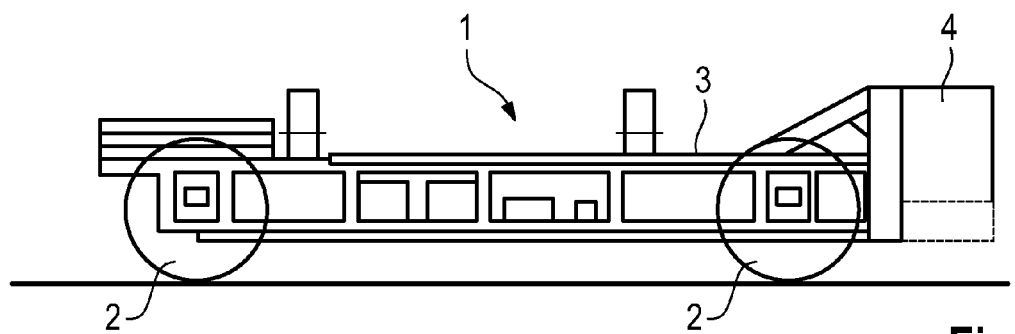
FIG. 1 is a schematic illustration of a side view of a trolley with a crash barrier.

FIG. 1 is a schematic side view of a trolley 1 with four wheels 2 and a supporting structure 3. The supporting structure 3 has an appropriate mass for simulating a motor vehicle. A crash barrier 4 is arranged on a front side of the supporting structure 3. The trolley 1 is moved with the crash barrier 4 toward a vehicle to be tested to simulate a collision. The impact can take place against a side of the vehicle, a front of the vehicle or a rear of the vehicle. The crash barrier 4 is designed so that, although an impact with a vehicle can be carried out with the aid of the trolley, only the crash barrier 4 and not the trolley 1 is damaged during the impact. Nevertheless, the impact constitutes a realistic situation of the masses and pulses of a collision between two vehicles. The crash barrier 4 is replaced by a new crash barrier after the impact has been implemented.

Figure 2:
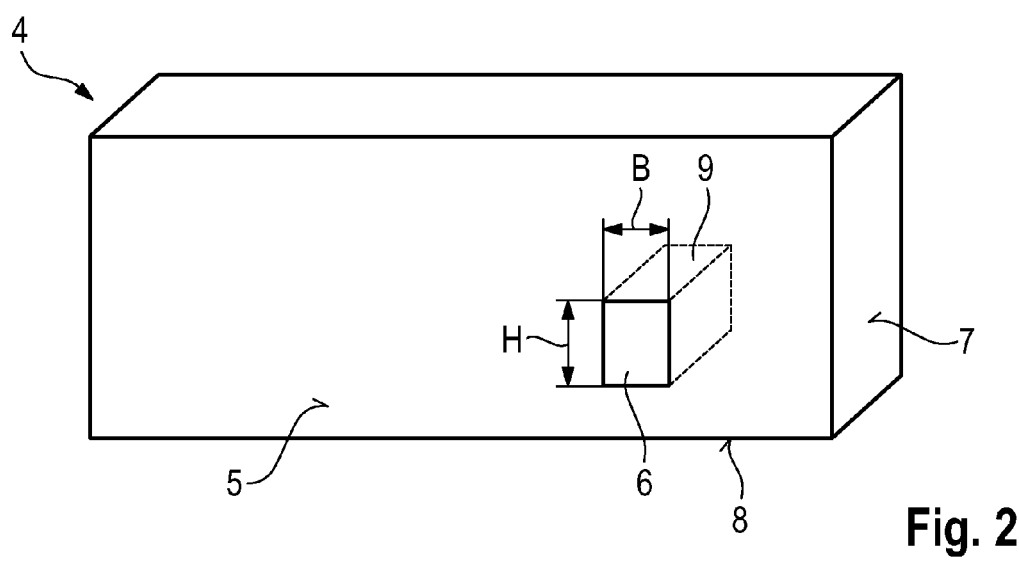
FIG. 2 is a schematic illustration of a front view of the crash barrier.

FIG. 2 is a schematic illustration of a front 5 of the crash barrier 4. A selected surface region 6 is illustrated in the front side 5. The front side 5 has a substantially rectangular shape, wherein the width can be within the range of 150 cm and 170 cm and the height can be within the range of between 60 cm and 80 cm. The surface region 6 can have a width B of between 10 cm and 30 cm and a height of between 10 cm and 30 cm. For example, the width B can be within the range of 18 cm to 20 cm and the height H can be within the range of 19 cm to 21 cm. In the illustrated embodiment, the surface region 6 is arranged in the vicinity of a right side edge 7 of the crash barrier 4. In the illustrated exemplary embodiment, the selected surface region 6 is at a lateral distance within the region of 40 cm from the side edge 7 and is at a distance from a lower side 8 of the crash barrier 4 within the region of 12 cm. Other distances from the lower side 8 or from the side edge 7 also can be selected depending on the selected embodiment. The surface region 6 constitutes a front of a selected volume region 9 that is formed in the crash barrier 4 behind the surface region 6. The selected volume region 9 preferably has the constant cross section of the surface region 6 and extends parallel to the lower side 8 and to the side edge 7. Depending on the selected embodiment, the cross section of the volume region 9 can change or be arranged in a different orientation in the crash barrier 4.

Figure 3:
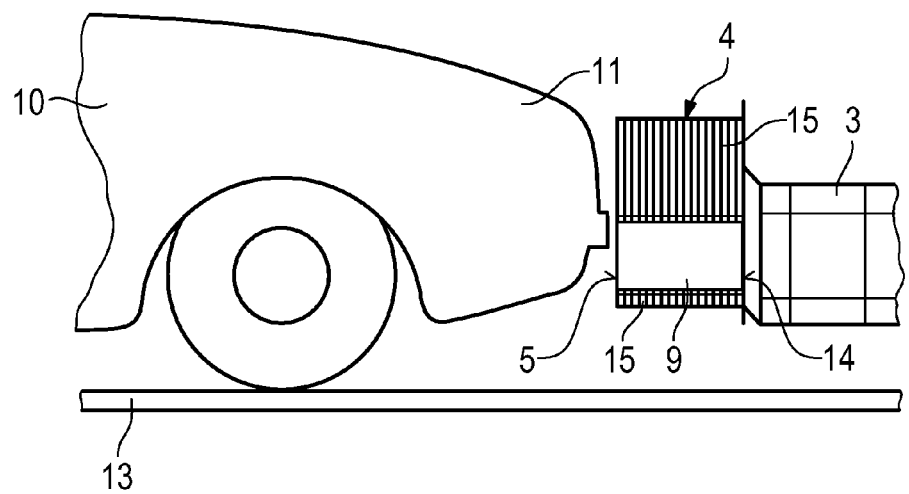
FIG. 3 is a schematic cross section through the crash barrier in a vertical plane.

FIG. 3 is a schematic illustration of a cross section in a vertical plane through the crash barrier 4 and through a part of the supporting structure 3 of the trolley 1 and through a part of a rear 11 of a vehicle 10 standing on a surface 13. It can be seen in the illustrated embodiment that the volume region 9 that illustrated as a dark surface extends from the front 5 as far as a rear side 14 which is connected to the supporting structure 3. The supporting structure 3 is produced from a material that has a significantly greater level of rigidity than the crash barrier 4, in particular the volume region 9.

FIG. 3 shows the situation in the event of an impact test against a rear of a vehicle 10. The volume region 9 of the crash barrier 4 here is arranged level with a lower region of the rear 11.

Figure 4:
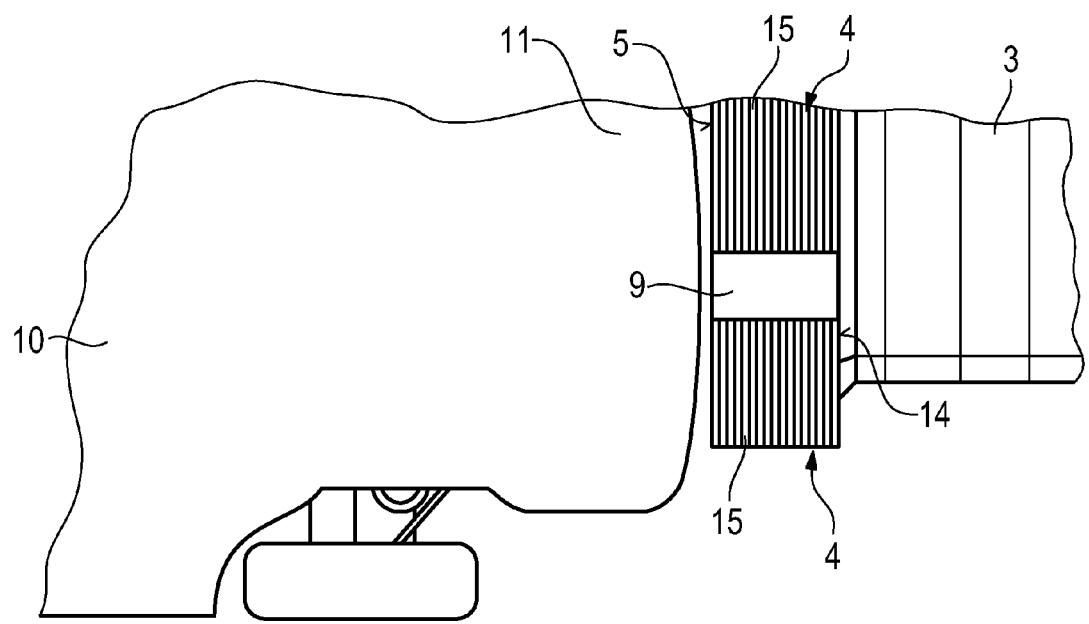
FIG. 4 is a schematic cross section through the crash barrier in a horizontal plane.

FIG. 4 shows the arrangement of FIG. 3 in a horizontal cross section. It can be seen here that the crash barrier 4 is offset laterally with respect to the vehicle 10, and therefore the volume region 9 is arranged in a central region of the body of the vehicle 10. In the impact situation illustrated, there is a nominal offset of 70%, i.e. the crash barrier 4 is arranged in the transverse direction offset by 70% in relation to the vehicle 10. Of course, the crash barrier 4 can also be used for other impact tests with a different offset.

Depending on the selected embodiment, the volume region 9 is produced from the same material as the other regions of the crash barrier 4. For example, aluminum has been shown to be advantageous for forming the crash barrier 4 with the volume region 9. The volume region 9 has an increased level of rigidity in relation to the surrounding region 15 of the crash barrier 4. The rigidity is at least twice the amount, preferably triple the amount or even six times the amount of the rigidity in the remaining region of the crash barrier 4. For example, the crash barrier can have a rigidity of 100 psi outside the volume region 9 and the volume region 9 can have a rigidity of 300 to 700, for example 600 psi. A resulting force within the range of between 140 kN and 180 kN, can be depicted with the aid of the trolley 1 and the crash barrier 4. Higher forces or lower forces also can be depicted depending on the selected embodiment.

In the embodiment with the same material for the volume region 9 of the crash barrier 4 and the further regions of the crash barrier 4, can use, for example, a honeycomb structure to depict the increased level of rigidity of the volume region 9. In this embodiment, the honeycomb structure has a smaller honeycomb size in the volume region 9 than in the surrounding region of the crash barrier 4.

In a further embodiment, the volume region 9 can be formed from a different material than the remaining region of the crash barrier 4. The material of the volume region 9 has the desired increased level of rigidity in comparison to the other material of the crash barrier 4.

Figure 5:
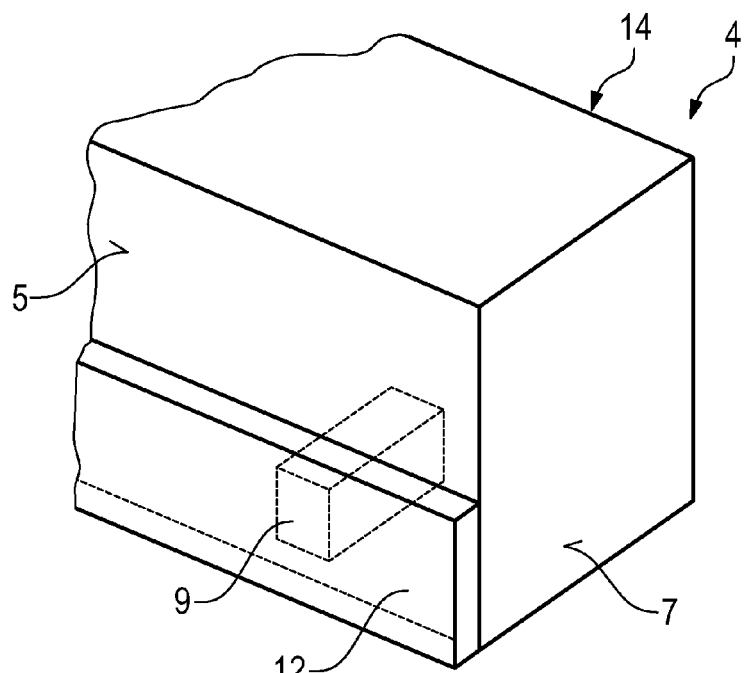
FIG. 5 is a schematic illustration of a partial region of the crash barrier.

FIG. 5 is a schematic perspective illustration of a right partial section of the crash barrier 4, with the three-dimensional arrangement of the volume region 9 illustrated schematically. In addition, in this embodiment, the crash barrier 4 has an impact layer 12 running transversely on the front side 5. The impact layer 12 depicts the mechanical properties of a bumper of a vehicle. Depending on the selected embodiment, the impact layer 12 can be omitted and the depiction of the bumper integrated into the crash barrier 4.

Figure 6:
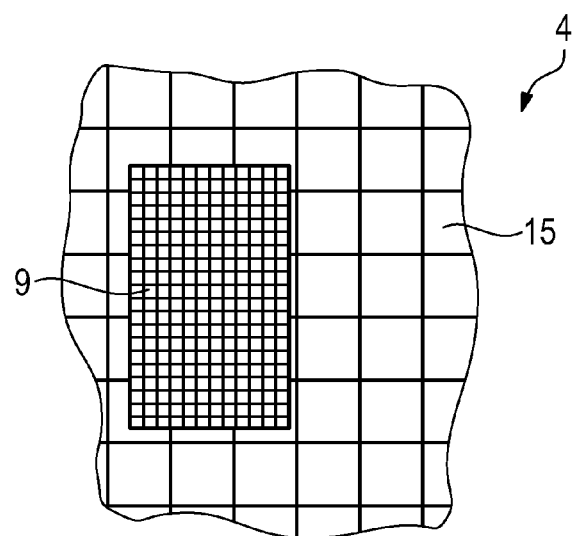
FIG. 6 is a schematic partial cross section through the crash barrier.

FIG. 6 shows schematically a partial cross section through a crash barrier 4, wherein a honeycomb structure which has smaller honeycombs than in the surrounding region 15 is formed in the selected volume region 9.

What is claimed is:

1. A crash apparatus for implementing a collision situation with a vehicle, the crash apparatus comprising:
   a trolley movable toward the vehicle when the collision situation is implemented;
   a crash barrier extending in forward and rearward directions and having a front surface facing the vehicle and a rear surface opposite the front surface, the front surface having a width dimension and a height dimension, a high rigidity portion formed in the crash barrier and having a greater level of rigidity than adjacent regions of the crash barrier, the high rigidity portion extending in the forward and backward directions between the front and rear surfaces and including a forward-facing surface forming a portion of the front surface of the barrier, wherein
   a surface area of the forward-facing surface of the high rigidity portion is not more than 50% of a total surface area of the front surface.

2. The crash apparatus of claim 1, wherein the high rigidity portion and the adjacent regions of the crash barrier are produced from the same material, and the material in the high rigidity portion has a different structure than in the surrounding areas.

3. The crash apparatus of claim 2, wherein the material has a honeycomb structure, and wherein a size of honeycombs in the high rigidity portion is smaller than in the adjacent region of the crash barrier.

4. The crash apparatus of claim 1, wherein the crash barrier is formed of a first material, and the high rigidity portion is formed of a second material different from the first material, and wherein the second material is more rigid than the first material.

5. The crash apparatus of claim 1, wherein the level of rigidity of the high rigidity portion is at least double the level of rigidity of the adjacent region.

6. The crash apparatus of claim 1, wherein the forward-facing surface of the high rigidity portion has a width within the range of between 10 and 30 cm and a height within the range of between 10 and 30 cm, the width being arranged along a transverse extent of the crash barrier, and the height being arranged along a vertical extent of the crash barrier.

7. The crash apparatus of claim 1, wherein the crash barrier is produced from aluminum.

8. A crash apparatus for implementing a collision situation with a vehicle, the crash apparatus comprising:
   a trolley movable toward the vehicle when the collision situation is implemented;
   a crash barrier extending in forward and rearward directions and having a front surface facing the vehicle and a rear surface opposite the front surface, the front surface having a width dimension and a height dimension, a high rigidity portion formed in the crash barrier and having a greater level of rigidity than adjacent regions of the crash barrier, the high rigidity portion extending in the forward and backward directions between the front and rear surfaces and including a forward-facing surface forming a portion of the front surface of the barrier, wherein
   the high rigidity portion has a first honeycomb structure, and adjacent regions of the crash barrier have a second honeycomb structure, and a size of the honeycombs of the first honeycomb structure is smaller than a size of the honeycombs of the second honeycomb structure.

9. The crash apparatus of claim 8, wherein the crash barrier is formed of a first material, and the high rigidity portion is formed of a second material different from the first material, and wherein the second material is more rigid than the first material.

10. The crash apparatus of claim 8, wherein the level of rigidity of the high rigidity portion is at least double the level of rigidity of the adjacent region.

11. The crash apparatus of claim 8, wherein the forward-facing surface of the high rigidity portion has a width within the range of between 10 and 30 cm and a height within the range of between 10 and 30 cm, the width being arranged along a transverse extent of the crash barrier, and the height being arranged along a vertical extent of the crash barrier.

12. The crash apparatus of claim 8, wherein the crash barrier is produced from aluminum.

13. The crash apparatus of claim 8, wherein the crash barrier has opposite upper and lower surfaces, and the high rigidity portion has opposite upper and lower surfaces arranged parallel to the upper and lower surfaces of the crash barrier.

14. The crash apparatus of claim 8, wherein the level of rigidity of the high rigidity portion is at least triple the level of rigidity of adjacent areas of the crash barrier.

* * * * *